United States Patent [19]

DuBell

[11] Patent Number: 4,720,971
[45] Date of Patent: Jan. 26, 1988

[54] METHOD FOR DISTRIBUTING AUGMENTOR FUEL

[75] Inventor: Thomas L. DuBell, Palm Beach Gardens, Fla.

[73] Assignee: United Technologies Corporation, Hartford, Conn.

[21] Appl. No.: 902,346

[22] Filed: Aug. 29, 1986

[51] Int. Cl.⁴ ............................................. F02K 3/10
[52] U.S. Cl. ..................................... 60/204; 60/261
[58] Field of Search ............... 60/39.03, 39.06, 246, 60/247, 261, 204

[56] References Cited

U.S. PATENT DOCUMENTS

| | | | |
|---|---|---|---|
| 2,887,845 | 5/1954 | Hagen | 60/261 |
| 2,984,970 | 5/1961 | Bertaux | 60/261 |
| 3,698,186 | 10/1972 | Bean et al. | 60/261 |
| 3,719,042 | 3/1973 | Chamberlain | 60/261 |
| 4,315,401 | 2/1982 | Beal et al. | 60/261 |
| 4,423,595 | 1/1984 | McLean | 60/261 |

Primary Examiner—Louis J. Casaregola
Attorney, Agent, or Firm—Troxell K. Snyder

[57] ABSTRACT

A method for distributing a flow of fuel over the gas flow area of a gas turbine engine includes the steps of dividing the gas flow area into a plurality of sector shaped sub-areas (48), (50), (52), (54) disposed within a surrounding, annular sub-area (46) which is in turn disposed adjacent the augmentor wall (12). During operation, the method according to the present invention distributes the fuel over one or more of the sub-areas (46-54) in response to the current rate of fuel flow. At the lowest and intermediate fuel flow rates, fuel is distributed only over one or more of the sector shaped sub-areas (48-54). Only at the very highest rates of augmentor fuel flow is fuel distributed finally in the outer annular sub-area (46).

7 Claims, 5 Drawing Figures

METHOD FOR DISTRIBUTING AUGMENTOR FUEL

FIELD OF THE INVENTION

The present invention pertains to a method for distributing fuel over the flow area of a thrust augmentor used in conjunction with a gas turbine engine or the like.

BACKGROUND

The use of thrust augmentors, or afterburners, in conjunction with gas turbine engines for aircraft propulsion purposes is a well known method for achieving elevated levels of thrust from a given size engine. A typical thrust augmentor includes a cylindrical extension disposed immediately downstream of the gas turbine engine exhaust and receiving some or all of the discharged exhaust gases therefrom.

A fuel distribution assembly is located at the upstream end of the cylindrical extension for dispersing a varying amount of fuel into the exhaust gases whereupon a combustion reaction initiated and completed within the downstream portion of the cylindrical extension further raises the temperature and energy content of the exhaust stream for providing the desired additional thrust.

Typical additional components are a flame holder assembly located downstream of the fuel distribution means for maintaining a stable flame in a desired radial plane, an adjustable throat exhaust nozzle disposed downstream of the cylindrical extension, and an igniter means for initiating the combustion reaction in the augmentor. As will be appreciated by those skilled in the art, certain limitations on the operation and design of the above-described thrust augmentor are necessary in order to achieve safe, effective, and stable operation of the engine-augmentor combination.

One such constraint is the requirement that such augmentors provide a varying amount of additional thrust in response to pilot demand. This feature allows operation of the aircraft in flight regimes not normally achievable with a non-thrust augmented engine configuration. For these and other reasons it is desirable to provide an augmentor arrangement having a fuel turn-down ratio of up to 10:1 as compared to maximum augmentor fuel flow. Such a wide range of variation in fuel flow rate has led to the use of various fuel distribution structures, including primary and secondary flow fuel nozzles, varying area fuel nozzles, etc.

A second limitation on augmentor operation involves the minimum and maximum fuel-to-air ratios which must be locally present in the augmentor in order to achieve stable and efficient combustion. As will be apparent to those skilled in the combustion art, introducing an insufficient local concentration of fuel will give a fuel-air mixture which is reluctant to light off and may fluctuate, blow out, or otherwise be unstable even if ignition is achieved. Too high a fuel-air ratio in a local area conversely results in incomplete combustion, reduced reaction temperature, and possible unstable operation.

A third constraint in augmentor operation is the impact of lighting off an augmentor on the upstream gas turbine engine. Augmentors achieve increased thrust by accelerating the engine exhaust gases immediately downstream of the engine. The initiation of combustion in the cylindrical augmentor produces a temporary pressure increase which can cause surging in the upstream fan in an augmented ducted bypass turbofan type engine. It is thus important to incrementally stage and limit the initiation and addition of fuel to the augmentor to avoid producing an undesirable pressure spike at the gas turbine engine exhaust.

Prior art augmentor fuel distribution schemes have addressed these needs by providing a plurality of annular, concentrically staged distribution zones or sub-areas wherein initial augmentor light off is accomplished by first providing fuel to only one of the concentric sub-areas of the total augmentor flow area, and by sequentially distributing additional fuel in adjoining concentric annular sub-areas as the rate of fuel flow is increased to satisfy demanded augmentor thrust. Full augmentor thrust and fuel flow is achieved by finally distributing fuel to the last annular sub-area disposed immediately inwardly adjacent to the interior surface of the wall of the cylindrical extension.

Examples in the prior art of such concentrically staged augmentation fuel distribution methods are disclosed in U.S. Pat. No. 3,698,186 issued Oct. 17, 1972 to Beane et al and U.S. Pat. No. 3,719,042 issued Mar. 6, 1973 to Chamberlain. One of the benefits of using concentrically staged annular sub-areas is the avoidance of initiating a combustion reaction adjacent the augmentor interior surface until only such time as maximum augmentor thrust is required. Such an operating method reduces the exposure of the inner surface to the high temperature augmentor combustion products, lengthening service life and avoiding costly and time consuming replacements.

Chamberlain utilizes a plurality of concentric annular fuel spraybars to deliver fuel to concentrically staged sub-areas. Beane et al shows the use of a plurality of radially extending spraybars which are individually easily removable for service or replacement. As will be appreciated by a review of the Beane et al patent, the number of fuel conduits in the radially innermost extending group of fuel spraybars is equal to the number of concentric fuel distribution sub-areas employed by the fuel distribution scheme. Thus, a four stage concentric fuel distribution scheme requires a radial spraybar having at least four internal fuel conduits, and, in the case of a primary-secondary fuel distribution scheme, eight conduits are required. This large number of conduits necessary in each full length radial spraybar adds to the complexity of the spraybar system and increases the likelihood of failure or other malfunction.

The spraybar system according to Beane also utilizes three differeing length spraybars to achieve the staged concentric fuel distribution, decreasing parts standardization for a given engine. What is needed is a method of distributing fuel over the gas flow area of a thrust augmentor which operates within the above-identified constraints but which does not require the use of complicated and hard-to-service fuel distributing apparatus.

DISCLOSURE OF THE INVENTION

It is therefore an object of the present invention to provide a method for distributing fuel over the gas flow area of a circular augmentor duct in a series of sequential stages corresponding to the current rate of fuel flow.

It is further an object of the present invention to distribute the flow of fuel over one or more sub-areas within the gas flow area, the number of individual sub-areas receiving fuel being responsive to the current rate of fuel flow.

It is further an object of the present invention to provide a distribution of sub-areas wherein no more than two sub-areas are intersected by a single radius extending from the augmentor center line to the cylindrical augmentor wall.

It is further an object of the present invention to reduce heat transfer to the inner surface of the augmentor by providing for the distribution of fuel to an annular sub-area disposed adjacent the outer periphery of the augmentor flow area only during periods wherein the augmentor is receiving fuel at the highest rates of flow.

It is further an object of the present invention to minimize the number of fuel igniters necessary for igniting the augmentor by distributing successively higher rate stages of fuel flow only to those sub-areas adjacent to sub-areas already receiving fuel, thereby propagating the combustion reaction.

It is still further an object of the present invention to size the individual sub-areas and fuel flow rate divisions so as to avoid inducing a temporary over pressure in the augmentor and/or undesirably high back pressure for the gas turbine engine.

According to the present invention, the circular flow area of a gas turbine engine augmentor is divided into a plurality of sub-areas. One sub-area is annular in shape and disposed adjacent the inner side of the augmentor wall. The remaining sub-areas are defined in the shape of sectors of the circular area remaining within the annular sub-area.

During operation of the augmentor according to the method of the present invention, the augmentor fuel flow is distributed over one or more sub-areas responsive to the current rate of fuel flow. For the very lowest rate of augmentor fuel flow, fuel is distributed to only one sector shaped sub-area. For increasingly higher fuel rates, additional sector sub-areas are added as necessary to maintain the optimum fuel to air ratio range in each sub-area.

Only at the highest rates of fuel flow is fuel finally distributed to the annular sub-area, thereby heating the otherwise relatively cool gas adjacent the augmentor interior wall. When used in an augmentor-equipped, ducted bypass turbofan engine, the method of the present invention further allows independent control of the local fuel air ratio in the bypass airflow stream.

Another advantage of the sector-staged augmentor fuel distribution method is the limited number of sub-areas required along any one radius to allow proper staging of the fuel distribution over the augmentor flow area. According to the preferred method of the present invention, no more than two sub-areas are defined along any one radius, reducing the number of radial or other fuel conduits necessary to distribute the fuel as compared to prior art concentrically-staged methods. For augmentors utilizing radially oriented spraybars in particular, the present method of introducing fuel in sectored stages eliminates the need for the complex plumbing used in prior art systems to achieve staged concentric fuel distribution.

Finally, by first introducing the initial augmentor fuel into a particular sector sub-area and by introducing increasing flows of fuel into only bordering sub-areas, the method according to the present invention allows placement of any augmentor igniters only in that particular sector sub-area without jeopardizing light-off and flame stability at higher fuel flows. Both these and other advantages will be apparent following a review of the following description and the appended claims and drawing figures.

DETAILED DESCRIPTION OF THE INVENTIVE METHOD

Figure 1:
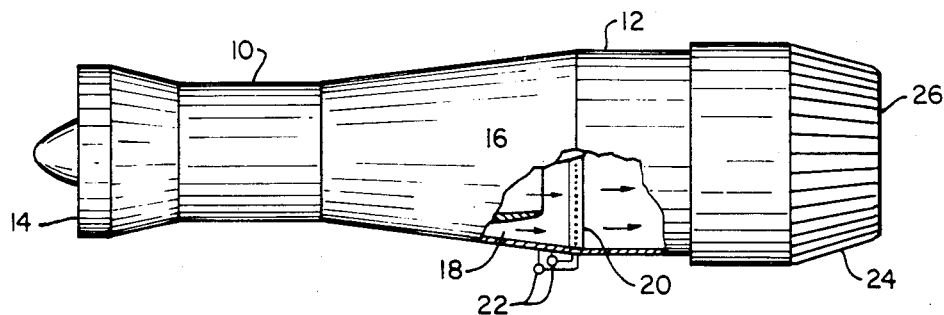
FIG. 1 shows a side view of an augmentor equipped, ducted bypass turbofan engine with a portion cut away in the vicinity of the augmentor fuel distribution means.

FIG. 1 shows a gas turbine engine 10 with a cylindrical thrust augmentor section 12 disposed immediately downstream thereof. The particular engine shown in a ducted turbofan configuration, wherein an inner core engine gas flow stream passes sequentially through a compressor section, a combustor section, and a turbine section before being exhausted through the core engine outlet nozzle 16. An outer annular airflow stream driven by a fan section (not shown) disposed immediately downstream of the engine inlet 14 bypasses the core engine through an outer annular duct 18 as shown.

The augmentor section includes a fuel distribution means 20 such as the radial spraybar shown in FIG. 1 for distributing a flow of fuel supplied via conduits 22 in response to demanded engine thrust. A variable area outlet nozzle 24 operates to control the velocity of the exhaust gases issuing from the nozzle outlet opening 26. Such augmentor arrangements may also include a flameholder (not shown) disposed downstream of the fuel distribution means 20 for providing a plane of increased turbulence at which the combustion reaction is maintained.

Figure 2:
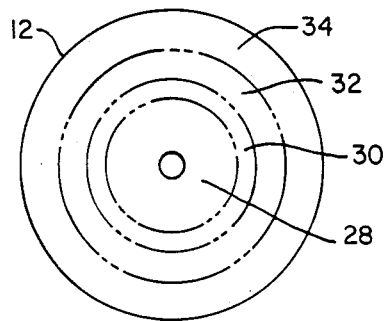
FIG. 2 schematically shows a prior art scheme for concentrically staging the distribution of fuel in the augmentor gas flow area.

FIG. 2 shows a prior art scheme for distributing fuel over the circular gas flow area enclosed by the cylindrical wall of the augmentor 12. In the FIG. 2 prior art augmentor staging method, the gas flow area is divided into four concentric sub-areas 28, 30, 32, 34. As discussed in the preceding background section, at initial and low fuel flow rates, fuel is initially admitted only to one of the sub-areas, such as the innermost sub-area 28, of the gas flow area wherein it is ignited to heat that portion of the engine exhaust gases flowing therethrough.

As thrust demand and augmentor fuel flow is increased, fuel is additionally routed to the concentrically disposed sub-areas 30, 32, 34 in sequence so as to maintain the local fuel-air ratio within the limits necessary for stable and efficient combustion. Only at the highest rates of fuel flow is fuel distributed within the outermost annular sub-area 34 thus reducing to the minimum the time during which the interior surface of the augmentor 12 is directly contacted by the combustion augmentor fuel.

Figure 3:
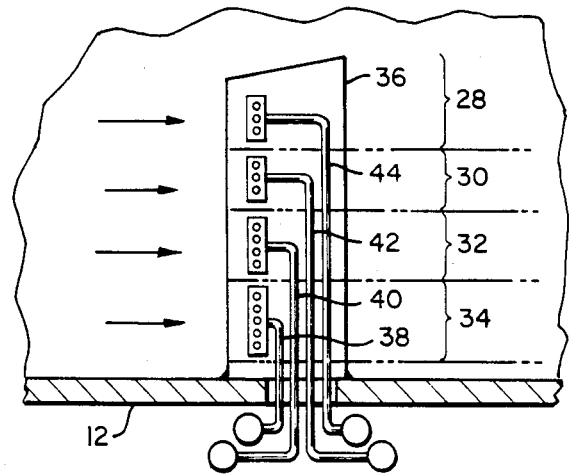
FIG. 3 shows a prior art radial fuel spraybar for providing fuel for concentrically staged sub-areas.

As also discussed in the preceding background section and illustrated in FIG. 3, a radial spraybar 36 according to the prior art is required to have as many internal fuel flow conduits 38, 40, 42, 44 as there are concentric sub-areas to be fueled. As can be appreciated by viewing FIG. 3, the internal structure of a spraybar 36 necessary to achieve the prior art concentrically staged fuel distribution is extremely complex and hence subject to increased failure rates and costs.

The method according to the present invention provides for the distribution of fuel over the gas flow area of a cylindrical augmentor 12 by dividing the range of fuel flow rate into a plurality of sub-ranges, each sub-range encompassing a distinct part of the overall range of values of the augmentor fuel flow rate, and each range further being sized to avoid the occurrence of an over pressure at the upstream gas turbine engine exhaust which in turn may result in a compressor surge or other engine operation disruption. The sub-range including the lowest rates of fuel flow is termed the "pilot sub-range", the highest rates of fuel flow are termed the "full thrust sub-range", and those sub-ranges intermediate the pilot and ultimate sub-ranges are denoted as "intermediate sub-ranges".

Figure 4:
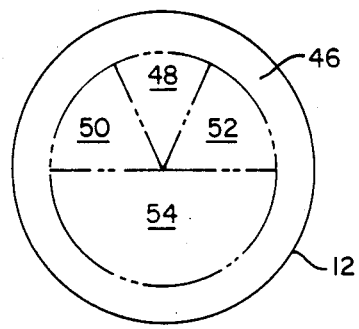
FIG. 4 schematically shows the method for staging the introduction of fuel into the augmentor flow area according to the method of the present invention.

Further according to the method of the present invention, the circular augmentor gas flow area is divided into a plurality of sub-areas 46, 48, 50, 52, 54 as shown in FIG. 4. One 46 of the plurality of sub-areas is annular in shape, being disposed inwardly adjacent the cylindrical augmentor wall 12. The remaining sub-areas define sectors within the circular area remaining within the annular sub-area 46 as shown schematically in FIG. 4.

Each sub-area 46-54 is allocated to one sub-range of augmentor fuel flow rates, with each sub-range being allocated at least one sub-area, and with the full thrust sub-range being allocated the annular shaped sub-area 46.

Operation of an augmentor according to the fuel distribution method of the present invention should now be apparent. Augmentor fuel flowing at a rate within the pilot sub-range is distributed over the sector shaped sub-area or sub-areas allocated thereto, with increasing rates of fuel flow falling within the sequentially higher intermediate fuel flow rate sub-ranges initiating distribution of the fuel over the correspondingly allocated sector shaped sub-areas until all the sector sub-areas within the annular sub-area 46 are receiving fuel. Finally, at the very highest rates of fuel flow falling within the full thrust sub-range, fuel is additionally distributed over the annular shaped sub-area 46.

The method according to the present invention preferably requires that sequentially adjacent fuel flow rate sub-ranges be allocated only adjacent sub-areas whereby propagation of the combustion reaction is assured. For example, if only sector shaped subregion 48 is allocated to the pilot sub-range, the next sequentially higher intermediate fuel flow rate sub-range may be allocated only sub-areas 50 or 52.

With further reference to FIG. 4, a four stage augmentor fuel distribution scheme according to the method of the present invention will be described. The total range of the varying augmentor fuel flow rate is divided into four successive sub-ranges, a pilot sub-range, a first intermediate sub-range, a second intermediate sub-range, and a full thrust sub-range, respectively.

Sector shaped sub-area 48 of FIG. 4 is allocated to the pilot sub-range, sub-areas 50 and 52 are allocated to the first intermediate sub-range, sub-area 54 is allocated to the secoind intermediate sub-range, and the annular sub-area 46 is allocated to the full thrust sub-range. The first intermediate sub-range is thus allocated the pair of sector shaped sub-areas 50, 52 circumferentially adjacent opposite sides of the sub-area 48 allocated to the pilot sub-range. This allocation maximizes the interface between the sub-areas allocated to adjacent fuel flow rate sub-ranges, thereby insuring the propagation of combustion as fuel is initially distributed to a previously unfired sub-area.

Figure 5:
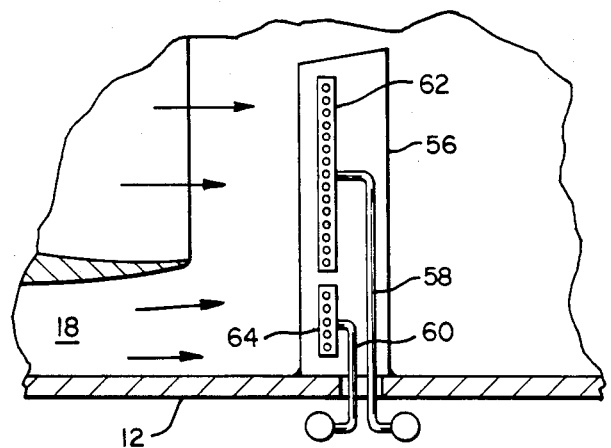
FIG. 5 shows a simplified fuel spraybar for use with the method according to the present invention.

The fuel distribution method according to the present invention is particularly well suited for use with radially oriented fuel distribution means such as the radial spraybars shown in FIG. 1 and FIG. 5. A radial spraybar disposed at any location about the circumference of the cylindrical augmentor 12 need distribute fuel to only two sub-areas along its length, the outer sub-area 46 and one inner, sector shaped sub-area, regardless of the total number of sub-areas in the augmentor. FIG. 5 shows the simplicity of such a spraybar 56, requiring only two internal fuel supply conduits 58, 60 and the associated fuel distribution structure 62, 64. The spraybar 56 for accomplishing fuel distribution according to the present method is interchangeable with any other spraybar within the augmentor, thus reducing the number of spare parts required to be kept on hand.

FIG. 5 also illustrates another advantage of the sector-annular staged fuel distribution according to the present invention wherein the bypass duct flow area of a gas turbofan engine corresponds to the outer annular sub-area 46 of the downstream augmentor for allowing independent control of the fuel air ratio in the bypass airflow stream. That such an air stream would have a different fuel-air ratio limitation than the core engine exhaust gas may be appreciated by noting that the oxygen content of the bypass air is higher than that of the core engine which has provided oxidant for the core engine combustor.

The advantage of the reduced number of fuel flow passages in an individual radial spraybar is doubled if so called primary-secondary fuel distribution systems are considered. These systems, well known in the art, utilize a pair of fuel distribution means for each sub-area supplied. A primary fuel delivery system supplies fuel to the sub-area at the initial light off and low flow rates, while the tandem secondary fuel delivery system provides the fuel flow capacity necessary to supply sufficient fuel to achieve a local maximum fuel-air ratio. Such systems, used to insure good atomization over a wide range of fuel flow turndown, effectively double the number of fuel flow conduits necessary to supply any one given sub-area within the augmentor. The four sector prior art radial augmentor of FIG. 3 thus must accommodate eight internal fuel conduits while the spraybar of FIG. 5 distributing fuel according to the method of the present invention would require only four, for any augmentor having three or more thrust stages and sub-areas.

The method for distributing fuel to a thrust augmentor according to the present invention is thus well adapted to achieve the objects and features as set forth hereinabove. It will further be appreciated by those skilled in the art that other fuel distribution methods may be proposed which differ from the preferred method disclosed herein but which fall within the scope of the present invention, and that the foregoing description must therefore be taken in an illustrative and not a limiting sense.

I claim:

1. A method for distributing a flow of fuel over a circular flow area in a gas turbine engine augmentor, the flow of fuel having a current flow rate variable over a range of flow rates, comprising the steps of:

dividing the augmentor flow area into a plurality of sub-areas, one sub-area being annular in shape and disposed adjacent the augmentor interior surface, and the other sub-areas being sectors of the circular area remaining within the one annular sub-area;

dividing the range of flow rates into a series of sub-ranges, the series comprising a pilot sub-range including the initial and lowest augmentor fuel flow rates, a full thrust sub-range including the highest and maximum augmentor fuel flow rates, and one or more intermediate sub-ranges including all augmentor fuel flow rates between the pilot and full thrust sub-ranges;

allocating one or more sub-areas to each fuel flow rate sub-range, the sector sub-areas being sub-ranges, and the annular sub-area being allocated to only the full thrust sub-range; and distributing the flow of fuel to those sub-areas allocated to sub-ranges corresponding to fuel flow rates up to and including the current rate of fuel flow.

2. The method as recited in claim 1, wherein the step of dividing the range of fuel flow rates into a series of sub-ranges includes the step of:

sizing each successive flow rate sub-range in the series responsive to the next lower sub-range for avoiding an over pressure in the augmentor upon transition between adjacent sub-ranges.

3. The method as recited in claim 1, wherein the step of allocating one or more augmentor flow sub-areas to each of the fuel flow rate sub-ranges includes the step of:

allocating a first sector sub-area to the pilot sub-range;

allocating second and third sector sub-areas to a first intermediate sub-range adjacent the pilot sub-range, the second and third sub-areas each disposed circumferentially opposite the first sub-area and adjacent thereto; and allocating a fourth sector sub-area to a second intermediate sub-range superadjacent the first intermediate sub-range, the fourth sub-area being circumferentially adjacent to at least the second sub-area.

4. The method as recited in claim 1, further comprising the step of:

providing a means for igniting the distributed fuel only in a first sub-area allocated to the pilot fuel flow rate sub-range.

5. The method as recited in claim 1, wherein the step of allocating one or more augmentor flow sub-areas to each fuel flow rate sub-range further includes the step of:

allocating to successively higher flow rate sub-ranges only those sub-areas adjacent to sub-areas allocated to lower fuel flow rate sub-ranges, whereby the flow of fuel is always distributed over a group of contiguous sub-areas.

6. A method for the staged distribution of fuel over the gas flow area of a gas turbine engine augmentor, comprising the steps of distributing the fuel over one or more sector shaped sub-areas disposed within an annular sub-area disposed adjacent the interior surface of the augmentor;

determining the number of fueled sector shaped sub-areas responsive to the current rate of augmentor fuel flow for achieving a local fuel-air ratio in each fueled sub-area corresponding to a stable combustion reaction downstream thereof; and finally distributing fuel over the outer annular sub-area for achieving maximum augmentor performance.

7. The method as recited in claim 6, further comprising the step of:

distributing the fuel over only adjacent sub-areas in response to increasing fuel flow, the fueled sub-areas always forming a contiguous grouping.

* * * * *

UNITED STATES PATENT AND TRADEMARK OFFICE
CERTIFICATE OF CORRECTION

PATENT NO. : 4,720,971

DATED : January 26, 1988

INVENTOR(S) : Thomas L. DuBell

It is certified that error appears in the above-identified patent and that said Letters Patent is hereby corrected as shown below:

Column 3, line 37, after "higher fuel" insert --flow--.

Claim 1, column 7, line 19, after "sub-areas being" insert --allocated only to the pilot and intermediate--.

Signed and Sealed this

Fifth Day of December, 1989

Attest:

JEFFREY M. SAMUELS

Attesting Officer                Acting Commissioner of Patents and Trademarks